United States Patent [19]

Maschio

[11] Patent Number: 4,470,467
[45] Date of Patent: Sep. 11, 1984

[54] VERTICAL AXIS EARTHWORKING IMPLEMENT

[75] Inventor: Paolo Barato, Campodarsego, Italy

[73] Assignee: Maschio S.p.A., Campodarsego, Italy

[21] Appl. No.: 154,468

[22] Filed: May 29, 1980

Related U.S. Application Data

[63] Continuation of Ser. No. 938,471, Aug. 31, 1978, abandoned, which is a continuation of Ser. No. 753,560, Dec. 22, 1976, abandoned.

[30] Foreign Application Priority Data

Mar. 29, 1976 [IT] Italy ............................ 41562 A/76

[51] Int. Cl.³ .................................................. A01B 33/06
[52] U.S. Cl. .................................... 172/49.5; 172/713
[58] Field of Search ............... 172/49.5, 59, 111, 713, 172/123, 119, 118; 56/294, 503, 295

[56] References Cited

U.S. PATENT DOCUMENTS

| D. 243,275 | 2/1977 | Lely | 172/59 |
|---|---|---|---|
| 985,871 | 3/1911 | Whipps | 172/713 |
| 2,088,141 | 7/1937 | Royston | 172/49.5 |
| 2,545,173 | 3/1951 | Shaw | 172/59 |
| 2,582,364 | 1/1952 | Tice | 172/59 |
| 3,129,772 | 4/1964 | Anderson | 172/42 |
| 4,037,669 | 7/1977 | Lely | 172/49.5 |
| 4,055,221 | 10/1977 | Lely | 172/59 |
| 4,057,110 | 11/1977 | Lely | 172/59 |

FOREIGN PATENT DOCUMENTS

| 260460 | 6/1963 | Australia | 172/59 |
|---|---|---|---|
| 306043 | 6/1918 | Fed. Rep. of Germany | |
| 1386256 | 12/1964 | France | 172/59 |
| 2034387 | 12/1970 | France | 172/59 |
| 2183571 | 12/1973 | France | 172/59 |
| 566954 | 9/1957 | Italy | 172/49.5 |
| 447693 | 3/1968 | Switzerland | 172/111 |

Primary Examiner—Richard J. Johnson
Attorney, Agent, or Firm—Fleit, Jacobson, Cohn & Price

[57] ABSTRACT

A vertical multi-axis cutter, comprising a plurality of knives mounted on axes of rotation that are vertical or somewhat inclined relative to the vertical, wherein said knives are arranged so that the cutting edge meets the circular path under an angle α other than zero relative to the tangential direction and preferably said angle α is of a value ranging between 15° and 35°, said values being determined by the machine feeding rate and rotational speed of the rotating shaft carrying the knife.

5 Claims, 17 Drawing Figures

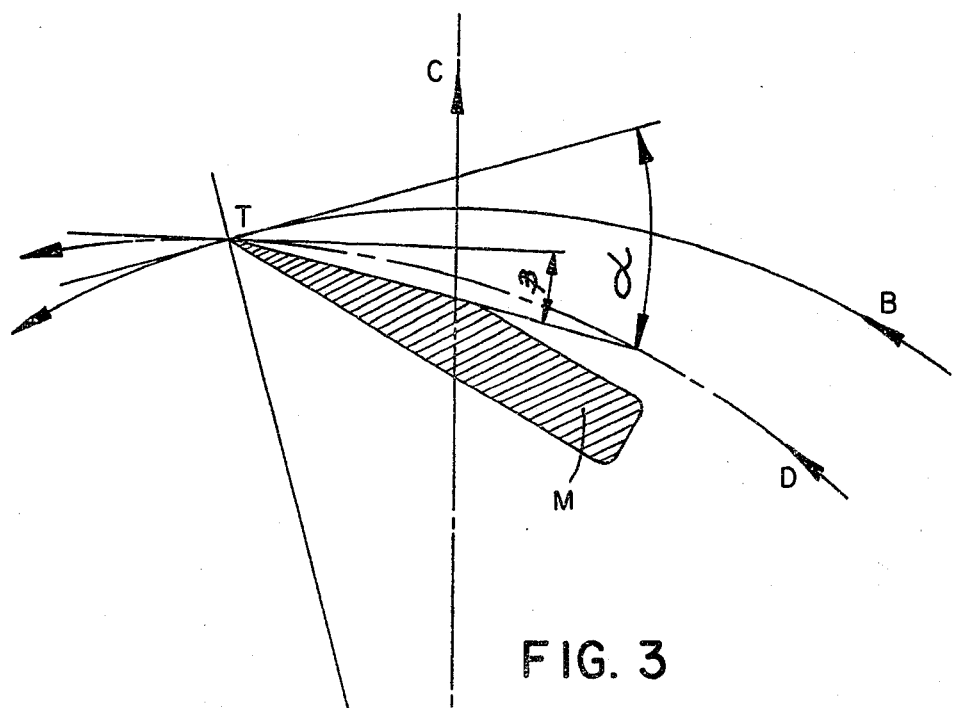
FIG. 3
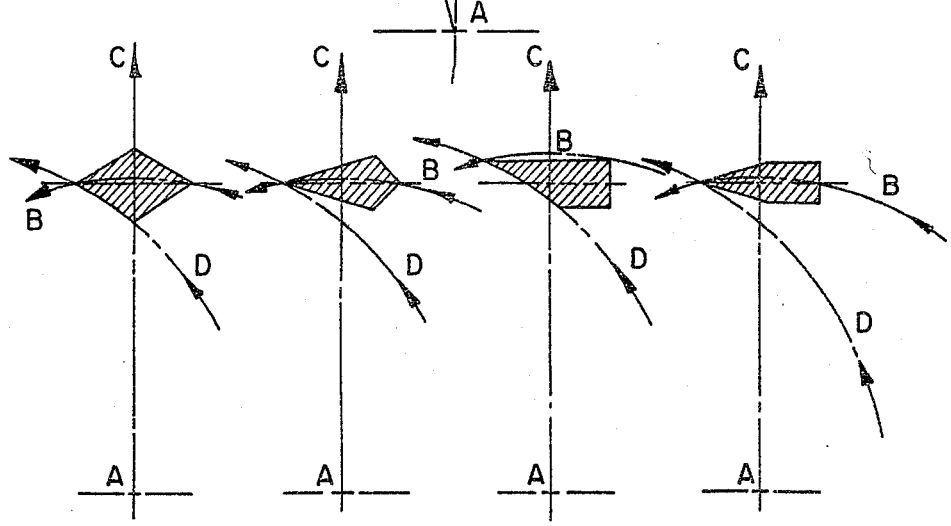
FIG. 4
PRIOR ART
FIG. 5
PRIOR ART
FIG. 6
PRIOR ART
FIG. 7
PRIOR ART

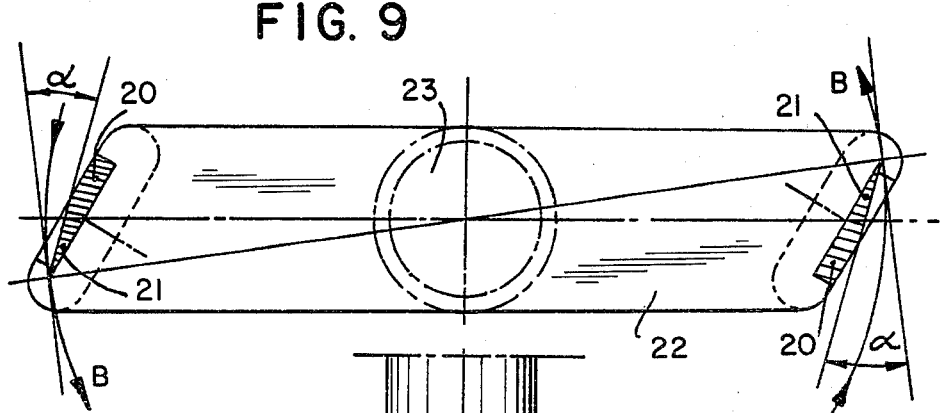
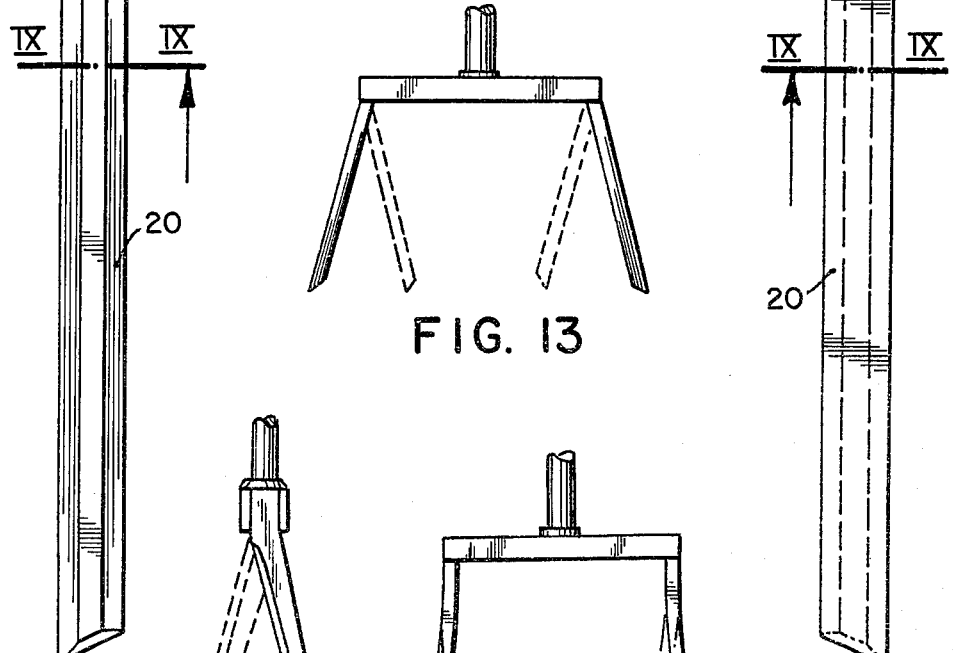

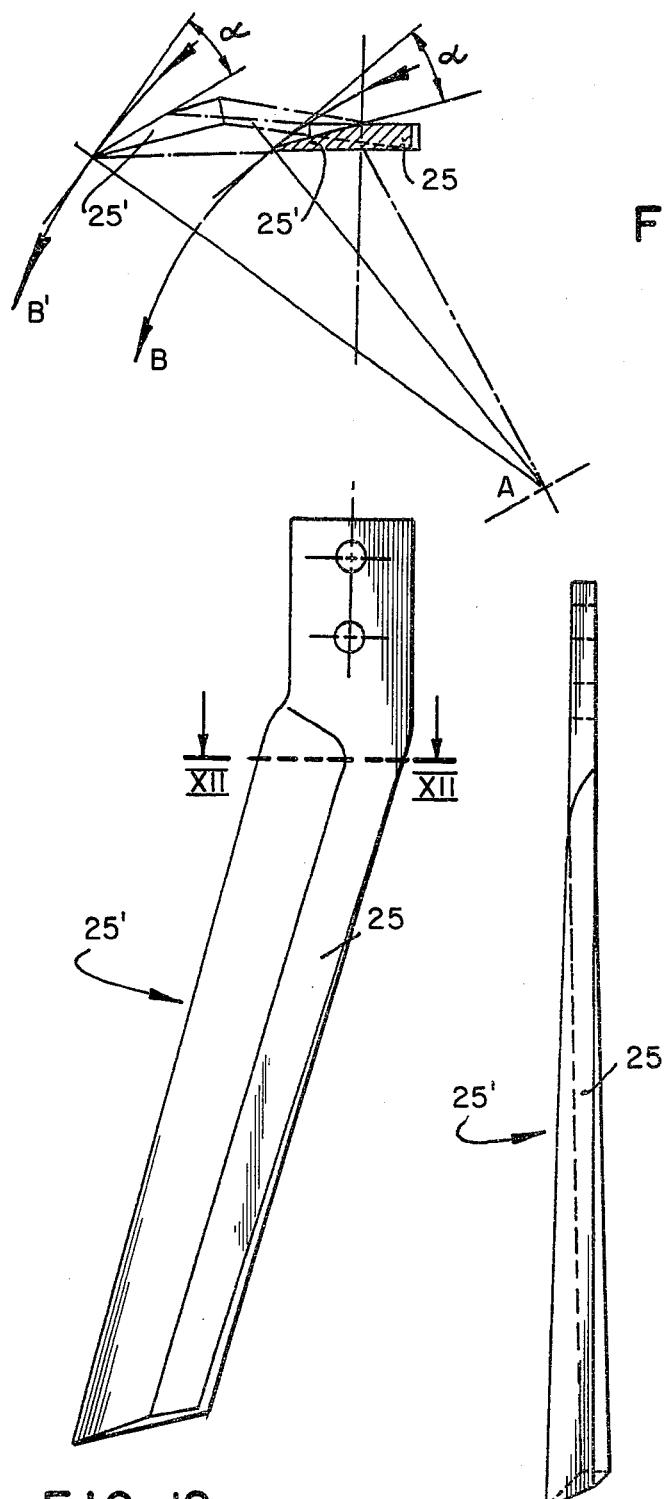
FIG. 12''
FIG. 12
FIG. 12'
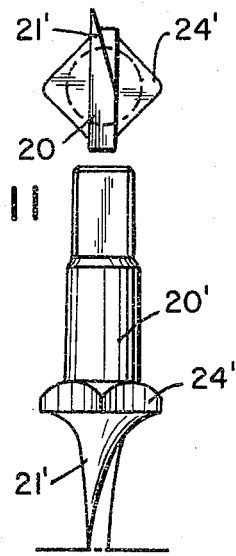
FIG. 11
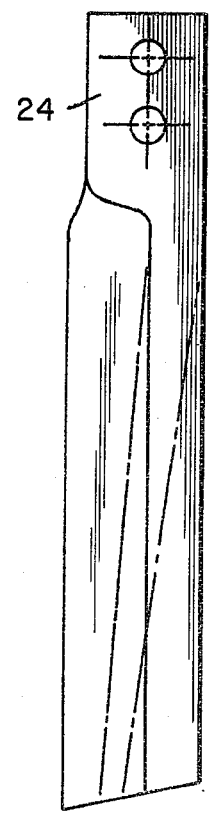
FIG. 10

VERTICAL AXIS EARTHWORKING IMPLEMENT

This is a continuation of application Ser. No. 938,471 filed Aug. 31, 1978, now abandoned, which is a continuation of Ser. No. 753,560 filed Dec. 22, 1976, now abandoned.

At present there is a tendency in farming to replace ploughing with milling, weeding and so on, so as to obtain a substantial saving in power and very good characteristics in worked ground or land.

As a matter of fact, a plough is an expensive implement affording by a large power a low yield in worked surface per hour.

In place of the plough, use is made of the known horizontal axis type of cutting machine, schematically shown in FIG. 2, that has partially solved the problem due to its limited cost, reduced absorbed power and good yield.

However, this machine suffers from the disadvantage of leaving the bottom of the ground underlying the portion operated on by the tool at a compact, crushed and impermeabilized state, whereby water drainage is hindered.

In these last few years, researches have been effected to provide machines having larger work capacities, less power absorption and capable of obviating the above mentioned disadvantages.

In the attempt of providing such requisites, approaches have been made of fitting the rotary vertical axis harrow, hitherto equipped with only percussion tools, with cutting blades, as shown in FIGS. 4, 5, 6 and 7, but without satisfactory result.

This can be readily understood when considering that to obtain a cutting action in such machines having a rotational movement B of the tool relative to its own vertical axis and a determined feeding rate C of the machine, the ground penetration path D is an epicycloid branch and not a tangent of the rotational circumference thereof. This proves the cutting impossibility of said attempts, as having at path D not a cutting edge, but a motion hindering face.

The above mentioned disadvantage has hitherto prevented the conversion of vertical axis harrow to cutting machines for processing compact grounds or lands, that is such a harrow could be used only for finishing operations of previously worked and turned soils or lands.

On the other hand, the use of a vertical axis cutter in place of a plough and horizontal axis cutter is extremely convenient, because of affording at a some worked band or width a deeper soil processing and less power absorption. Thus, when comparing FIGS. 1 and 2 schematically showing prior art cutters, it will be seen that in the case of a horizontal axis cutter (FIG. 2), the processing depth H is given by the cutter radius R less shaft radius R'.

In the case of a vertical axis cutter (FIG. 1), the processing depth H is equal to the entire length of the implement.

By mere way of unrestrictive example, by assigning values to the implements of the two possible solutions, the above statement is enhanced. Under identical conditions as to soil or land and feeding and rotational speeds, let it be:

L (width of the worked band) = 75 cm
H (work depth) = 20 cm
R' (diameter of tubular shaft) = 10 cm,
in FIG. 2 it will be H+R'=20+5=25 cm.

In FIG. 1, the same cut width L (75 cm) can be covered with three cutting tools of 20 cm rotating on a cut diameter of 25 cm, wherein R is 12.5 cm, that is just 50% of FIG. 2. Since, at a same amount of work to be carried out, the required power is directly proportional to the work of R carrying it out, the substantial saving being obtained will be appreciated.

Also as to the characteristics of the processed soil or land, the vertical axis cutter (of the type shown in FIG. 1) has advantages over the horizontal axis cutter (of the type shown in FIG. 2). Thus, while the horizontal axis cutter with the cutting tool bent at the end with a semihorizontal length or section compresses with its back the soil or land bottom T, impermeabilizing the same, the vertical cutter has on the bottom only the tip breaking the soil or land, without any compressive action thereon and creating optimum conditions of soil or aeration and drainage.

Therefore, as above mentioned, the use of vertical axis cutter on compact soils or lands has advantages of extreme interest. In order to allow for this operation, we have set up this invention that is concerned with significant improvements in or relating to a vertical axis type of cutter.

The novelty consists of the provision of a vertical axis machine capable of working a previously unturned soil or land. This was possible by adopting a work actuator tool, for the sake of brevity referred to as a "knife", capable of penetrating into a compact soil or land with an efficient cutting action.

BRIEF DESCRIPTION OF THE DRAWINGS

FIG. 3 is a graphic illustration of a knife M having a cutting edge T passing through a machine feeding direction C, a circular path of rotation B, and a path of penetration D.

FIGS. 4 through 7 are graphic representations of cutting tools having different cutting shapes shown passing through a machine feeding direction C, a circular path of rotation B and a path of penetration D.

FIGS. 8 through 11 illustrate an embodiment of the present invention, FIG. 8 being a side elevational view, FIG. 9 being a plan view taken along the section line IX—IX of FIG. 8, FIG. 10 illustrating a single knife of FIGS. 8 and 9, FIG. 11 illustrating an attachment of the knife.

FIG. 12 is a side view of a knife.

FIG. 12' is a view 90° out of phase from FIG. 12.

FIG. 12" is a schematic sectional view of the knife shown in FIGS. 12 and 12'.

FIGS. 13, 14 and 15 illustrate knives of different shapes mounted on a yoke of a spindle.

DETAILED DESCRIPTION OF THE DRAWINGS

Figure 1:
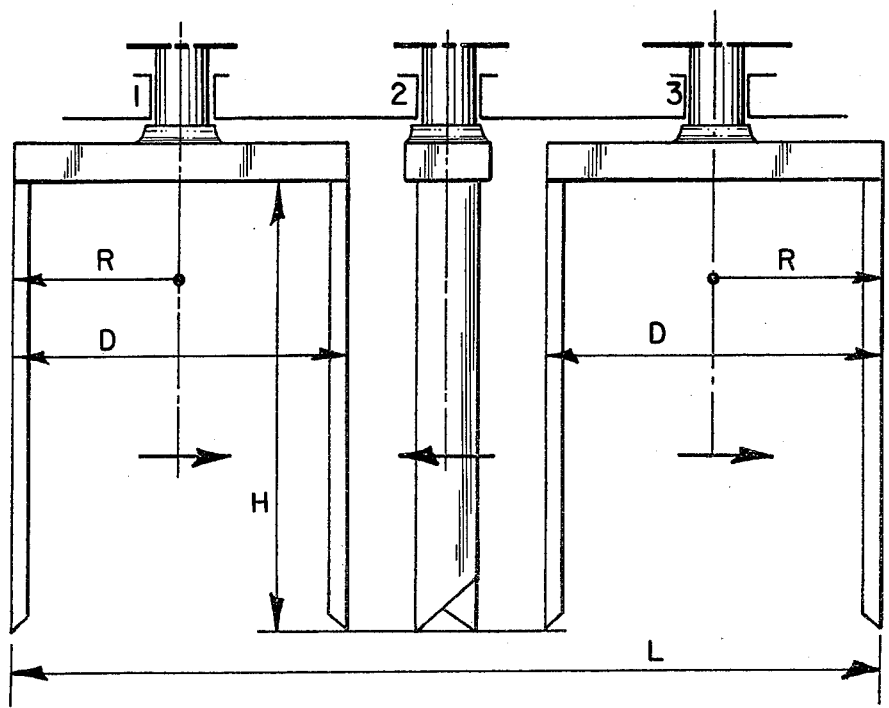
FIG. 1 is a known vertical axis cutter.
Figure 2:
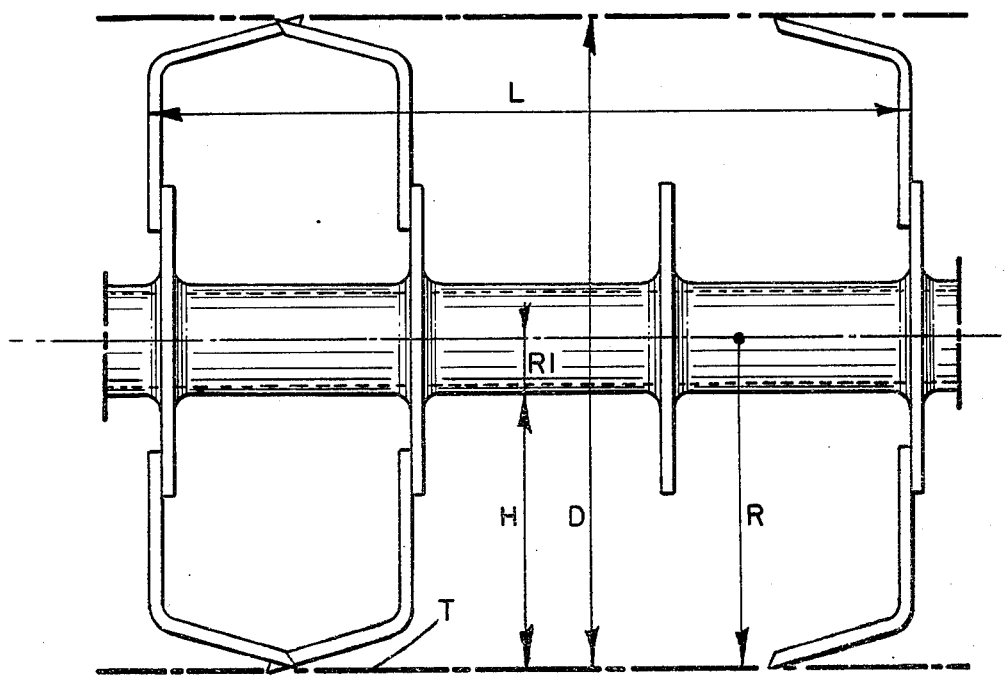
FIG. 2 is a known horizontal axis cutter.

FIG. 3 clearly shows the principle of operation for the invention. If C is the machine feeding direction, B is the circular path of knife M rotating on its own axis and D the path of penetration into the soil or land resulting from the dual movement and feeding, knife M is located with an angle of incidence or attack $\beta$ on path D, thereby forming a non-zero angle $\alpha$ with the tangent of cutting edge T of circumference B.

Of course, the value of this angle $\alpha$ is fixed for a particular knife M. The angle $\alpha$, however, is variable for different knife shapes and is selected depending on the machine feeding rate and the rotational speed of the vertical axes of the tools. Preferably, the clearance angle, that is the angle between the cutting edge and a path traversed by the cutting edge during movement, has a value ranging between 15° and 35°.

More particularly:

FIGS. 4 to 7 repeat the principle of FIG. 3 as carried out with cutting tools having different cutting shape.

FIGS. 8, 9, 10 and 11 show by mere way of unrestrictive example a practical embodiment of the invention.

In some processings, the need may arise of not arranging the knife at vertical attitude, but arranging it at an inwardly or outwardly inclined position relative to the axis of rotation, or quite shaping it as a curve.

An exemplary embodiment of this novel concept is clearly shown in FIGS. 8 and 9, respectively representing a side elevational view and a plan view according to section line IX—IX of FIG. 8 of a multi-cutter tool, wherein knives 20 are arranged with cutting edge 21 tangent to the circular path B and perpendicular to the axis of rotation. The two knives 20 are interconnected by a yoke 22 and rotate about the vertical spindle 23, having the rotational drive acting thereon. The tools comprising said knives 20, 21, yoke 22 and spindle 23 are all arranged on a common bearing bar and the adjoining tools have the yokes in timing relationship to one another in order to avoid any contact of the rotating knives during operation.

By way of example, FIG. 10 shows a knife of constant cut and blade section, and the hatch thereof shows how such a knife can be converted, while maintaining constant the cut section, to a knife of tapered section so as to reduce the operating friction while retaining the strength thereof.

FIG. 11 shows an example for a different attachment of the knife.

FIGS. 12 and 12' are two views at 90° to each other and FIG. 12" is a schematic sectional view showing that at any displacement of the cutting edge of a knife from the parallelism relative to the axis of rotation, there will correspond a twist of the section in order to retain angle α at a constant value throughout the length of said cutting edge. As illustrated in FIGS. 12 and 12', the cutting edge 25' substantially forms a surface line of a frustro-conical body. Thus, the cutting surface advances through a soil mass like a conical screw.

It should be noted that such a concept is also applicable to knives of different shapes, such as straight or curved, as shown for example in FIGS. 13, 14 and 15.

The solutions outlined in FIGS. 13 to 15 could be governed by the requirement of accomplishing such operations as burial, tillage, turning, weeding and the like, and the shape for the knives is provided and calculated to hold on the feature pointed out and considered as a basis of the inventive concept.

It should be noted that in these cases, since angle α has to remain constant and radius R varies with height, the knife takes a twisted shape and the blade has a helical pattern.

What is claimed is:

1. A cutter for an unturned soil mass comprising a vertically-extending rotatable spindle, a yoke mounted on said spindle and having arms rotatable about the axis of said spindle, and a plurality of knives mounted on and extending downwardly and outwardly from said arms of said yoke, each of said knives having an outwardly facing surface with a leading edge forming a cutting edge during rotation, the outwardly facing surface being generally straight in cross section, each of said knives being uniformly twisted along its length with respect to an upper mounting portion so that all portions of the outwardly facing surface have a uniform clearance angle with respect to a circular trajectory defined by rotation of said yoke, said yoke being translatable during use so that the cutting edges follow epicycloid paths during penetration of a soil mass being worked.

2. According to claim 1, wherein the back of the knives is curved to provide for soil or land turning.

3. A cutter according to claim 1, wherein trailing portions of the outer surfaces of said knives are inwardly spaced from the circular trajectory defined by rotation of said yoke so that only the outwardly facing surfaces contact the soil mass being worked.

4. A cutter for working a soil mass, said cutter comprising a yoke mountable for rotation about a substantially vertical axis and having arms, and a plurality of knives mounted on and extending downwardly and outwardly from the arms of said yoke when said yoke is mounted in a working position, each of said knives having an outwardly facing surface with a leading edge forming a cutting edge during rotation, the outwardly facing surface being generally straight in cross section, each of said knives being uniformly twisted along its length with respect to an upper mounting portion so that all portions of the outwardly facing surface have a uniform clearance angle with respect to a circular trajectory defined by rotation of said yoke, the clearance angle being between 15° and 35°, said yoke being translatable so that the leading edges of said outer surfaces define cutting surfaces that follow epicycloid paths during penetration by said knives of a soil mass being worked.

5. A cutter according to claim 4, wherein all portions of the knives contacting the soil mass are encompassed within the epicycloid paths defined by the cutting surfaces of said knives.

* * * * *

UNITED STATES PATENT AND TRADEMARK OFFICE
CERTIFICATE OF CORRECTION

PATENT NO.   : 4,470,467
DATED        : September 11, 1984
INVENTOR(S)  : Paolo Barato It is certified that error appears in the above-identified patent and that said Letters Patent is hereby corrected as shown below:

On the cover page, in the left column, at the second line, the name "Maschio" should read --Barato--.

Signed and Sealed this

Fifth Day of March 1985

[SEAL]

Attest:

DONALD J. QUIGG

Attesting Officer     Acting Commissioner of Patents and Trademarks